United States Patent
Gattani et al.

(10) Patent No.: US 11,899,680 B2
(45) Date of Patent: Feb. 13, 2024

(54) TECHNIQUES FOR METADATA VALUE-BASED MAPPING DURING DATA LOAD IN DATA INTEGRATION JOB

(71) Applicant: Oracle International Corporation, Redwood Shores, CA (US)

(72) Inventors: Rohit Jaykumar Gattani, Bangalore (IN); Rahul Gupta, Dublin, CA (US); Arun Patnaik, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 29 days.

(21) Appl. No.: 17/690,495

(22) Filed: Mar. 9, 2022

(65) Prior Publication Data

US 2023/0289360 A1    Sep. 14, 2023

(51) Int. Cl.
  *G06F 17/00*    (2019.01)
  *G06F 16/25*    (2019.01)

(52) U.S. Cl.
  CPC .................. *G06F 16/254* (2019.01)

(58) Field of Classification Search
  CPC ........ G06F 16/13; G06F 16/24; G06F 16/156; G06N 3/00; G06N 5/00; G05B 13/00
  See application file for complete search history.

(56) References Cited

U.S. PATENT DOCUMENTS

| 8,515,898 B2 | 8/2013 | Bhide et al. | |
| 2005/0257193 A1* | 11/2005 | Falk | G06F 8/315 717/109 |
| 2008/0059889 A1* | 3/2008 | Parker | G06F 16/29 715/748 |
| 2009/0157801 A1* | 6/2009 | Barber | G06F 16/904 709/203 |
| 2009/0248714 A1* | 10/2009 | Liu | G06F 16/211 |

(Continued)

FOREIGN PATENT DOCUMENTS

| CN | 110569090 | 12/2019 |
| CN | 111737364 | 10/2020 |

OTHER PUBLICATIONS

"AWS Glue", Available Online at: https://aws.amazon.com/glue/?whats-new-cards.sort-by=item.additionalFields.postDateTime&whats-new-cards.sort-order=desc, Accessed from Internet on Feb. 3, 2022, 6 pages.

(Continued)

*Primary Examiner* — Hung D Le
(74) *Attorney, Agent, or Firm* — Invoke

(57) ABSTRACT

The present embodiments relate to metadata value-based mapping during a data load in a data integration job. A computing device can receive a first data set from a source system and computer-readable instructions to load data into a target system. The device can receive a first metadata set from the target system that describe destinations. The computing device can identify a first data value of the first data set that matches a metadata value of the first metadata set. The device can receive a data integration mapping of the second data value of the first data set to a data field associated with the matching metadata value of the first metadata set. The device can load the second data value of the first data set from the source system into the target system pursuant to the mapping and the computer-readable instructions.

34 Claims, 11 Drawing Sheets

(56) References Cited

U.S. PATENT DOCUMENTS

| | | | | |
|---|---|---|---|---|
| 2012/0095973 | A1* | 4/2012 | Kehoe | G06F 8/70 707/694 |
| 2012/0310875 | A1 | 12/2012 | Prahlad et al. | |
| 2013/0046953 | A1* | 2/2013 | Iyer | G06F 12/0851 711/E12.059 |
| 2013/0311498 | A1* | 11/2013 | Lambert | G06F 16/90 707/758 |
| 2014/0244868 | A1* | 8/2014 | Lee | G06F 13/4291 710/104 |
| 2016/0328566 | A1 | 11/2016 | Nellamakkada | |
| 2018/0316983 | A1* | 11/2018 | Jin | G06T 7/269 |
| 2021/0042353 | A1* | 2/2021 | Tandon | G06F 16/9017 |
| 2022/0036260 | A1* | 2/2022 | Krishnan | G06F 30/27 |
| 2022/0155801 | A1* | 5/2022 | van Dijk | G05D 1/0274 |
| 2023/0090244 | A1* | 3/2023 | Clarke | G06F 16/211 712/233 |

OTHER PUBLICATIONS

"Destinations", Available Online at: https://www.stitchdata.com/integrations/destinations/#multiple-destinations, 1 page.

"How to Load from Multiple Sources to Multiple Destination Dynamically", Available Online at: https://stackoverflow.com/questions/22774485/how-to-load-from-multiple-sources-to-multiple-destination-dynamically, 2014, 2 pages.

"Informatica Cloud Data Integration", Available Online at: https://www.informatica.com/content/dam/informatica-com/en/collateral/data-sheet/informatica-data-cloud-integration_data-sheet_3448en.pdf, 2020, 5 pages.

"Read Data from One Dataset and Load it into Multiple Database Tables", Available Online at: https://support.etlworks.com/hc/en-us/articles/360015068334-Read-data-from-one-dataset-and-load-it-into-multiple-database-tables, 2021, 3 pages.

"Transformations", Informatica® Cloud Data Integration, Available Online at: https://docs.informatica.com/content/dam/source/GUID-2/GUID-2B5E2342-3D75-4BCE-B092-A78F85631717/34/en/CDI_January2022_Transformations_en.pdf, Jan. 2022, 395 pages.

"What is Azure Data Factory?", Available Online at: https://docs.microsoft.com/en-us/azure/data-factory/introduction, Sep. 29, 2021, 6 pages.

"What is Data Migration? Guide to Data Migration Tools and Planning", Available Online at: https://www.stitchdata.com/resources/data-migration/, 1 page.

Fatima, "Understanding Data Mapping Tools, Process, and Techniques", Available Online at: https://www.astera.com/type/blog/understanding-data-mapping-and-its-techniques/, Dec. 10, 2018, 4 pages.

* cited by examiner

| PersonID 302 | PlanID 304 | CoverageAmount 306 | EnrollmentDate 308 | Department 310 |
|---|---|---|---|---|
| 1011 | 23 | 2000 | 12-12-2019 | DEPT-1 |
| 1022 | 23 | 8000 | 08-01-2020 | DEPT-1 |
| 1090 | 45 | 8900 | 03-07-2016 | DEPT-2 |
| 3450 | 45 | 9000 | 09-09-2018 | DEPT-1 |
| 2300 | 87 | 1000 | 02-01-2021 | DEPT-2 |

*FIG. 3*

| | |
|---|---|
| LIST OF BUCKETS IN A GIVEN TENANCY/COMPARTMENT | DEPT-1, DEPT-2, DEPT-3, DEPT-4, DEPT-5, DUMMY, DEPT-7, ALL BUCKET 402 |
| LIST OF PARTICULAR FILES IN A PARTICULAR BUCKET | DEPT-1=>SALES.CSV, OPPORTUNITY.CSV<br>DEPT-2=> ENROLLMENT.CSV 404 |
| LIST OF USER IN GIVEN TENANCY | USER1, USER2, USER3 406 |

*FIG. 4*

TECHNIQUES FOR METADATA VALUE-BASED MAPPING DURING DATA LOAD IN DATA INTEGRATION JOB

BACKGROUND

In cloud computing, data integration can be a process of integrating data between systems within a cloud computing environment, such as between a private cloud system and a public cloud system. The integrated data can create synchronized data stores in the systems and enable each user and application of the cloud computing environment to access the data remotely and efficiently.

BRIEF SUMMARY

The present embodiments relate to metadata value-based mapping during a data load in a data integration job. A first exemplary provides a computer-implemented method for performing a metadata value-based data mapping during a data integration job. The computer-implemented method can include a computing device receiving a first data set from a source system and computer-readable instructions to load data from the source system into a target system.

The computer-implemented method can further include receiving a first metadata set from the target system. The first metadata set from the target system can be associated with a second data set stored at the target system. The first metadata set can describe destinations at the target system.

The computer-implemented method can further include comparing the first data set from the source system to the first metadata set from the target system.

The computer-implemented method can further include identifying a first data value of the first data set from the source system that matches a metadata value of the first metadata set from the target system based on the comparison. The first data value can be associated with a second data value of the first set of values.

The computer-implemented method can further include receiving a data integration mapping of the second data value of the first data set from the source system to a data field associated with the matching metadata value of the first metadata set. The data integration mapping can be generated based on identifying the first data value of the first data set from the source system and the matching metadata value of the first metadata set from the target system.

The computer-implemented method can further include loading the second data value of the first set of values from the source system into the data field associated with the metadata value of the first metadata set from the target system pursuant to the mapping and the computer-readable instructions.

A second exemplary embodiment relates to a computing system. The computing system can include a processor and a non-transitory computer-readable medium. The non-transitory computer-readable medium can include instructions that, when executed by the processor, cause the processor to receive a first data set from a source system and computer-readable instructions to load data from the source system into a target system.

The instructions can further cause the processor to receive a first metadata set from the target system. The first metadata set from the target system can be associated with a second data set stored at the target system. The first metadata set can describe destinations at the target system.

The instructions can further cause the processor to compare the first data set from the source system to the first metadata set from the target system.

The instructions can further cause the processor to identify a first data value of the first data set from the source system that matches a metadata value of the first metadata set from the target system based on the comparison. The first data value can be associated with a second data value of the first data set.

The instructions can further cause the processor to receive a data integration mapping of the second data value of the first data set from the source system to a data field associated with the matching metadata value of the first metadata set. The data integration mapping can be generated based on identifying the first data value of the first data set from the source system and the matching metadata value of the first metadata set from the target system.

The instructions can further cause the processor to load the second data value of the first data set from the source system into the data field associated with the metadata value of the first metadata set from the target system pursuant to the mapping and the computer-readable instructions.

A third exemplary embodiment relates to a non-transitory computer-readable medium. The non-transitory computer-readable medium can include stored thereon a sequence of instructions, which when executed by a processor cause the processor to execute a process. The process can include receiving a first data set from a source system and computer-readable instructions to load data from the source system into a target system.

The process can further include receiving a first metadata set from the target system. The first metadata set from the target system can be associated with a second data set stored at the target system. The first metadata set can describe destinations at the target system.

The process can further include comparing the first data set from the source system to the first metadata set from the target system.

The process can further include identifying a first data value of the first data set from the source system that matches a metadata value of the first metadata set from the target system based on the comparison. The first data value can be associated with a second data value of the first data set.

The process can further include receiving a data integration mapping of the second data value of the first data set from the source system to a data field associated with the matching metadata value of the first metadata set. The data integration mapping can be generated based on identifying the first data value of the first data set from the source system and the matching metadata value of the first metadata set from the target system.

The process can further include loading the second data value of the first data set from the source system into the data field associated with the metadata value of the first metadata set from the target system pursuant to the mapping and the computer-readable instructions.

BRIEF DESCRIPTION OF THE DRAWINGS

FIG. 3 is a block diagram illustrating an exemplary data table of metadata values and data values, according to at least one embodiment.

FIG. 4 is a block diagram illustrating an exemplary data table of metadata values, according to at least one embodiment.

DETAILED DESCRIPTION

Figure 1:
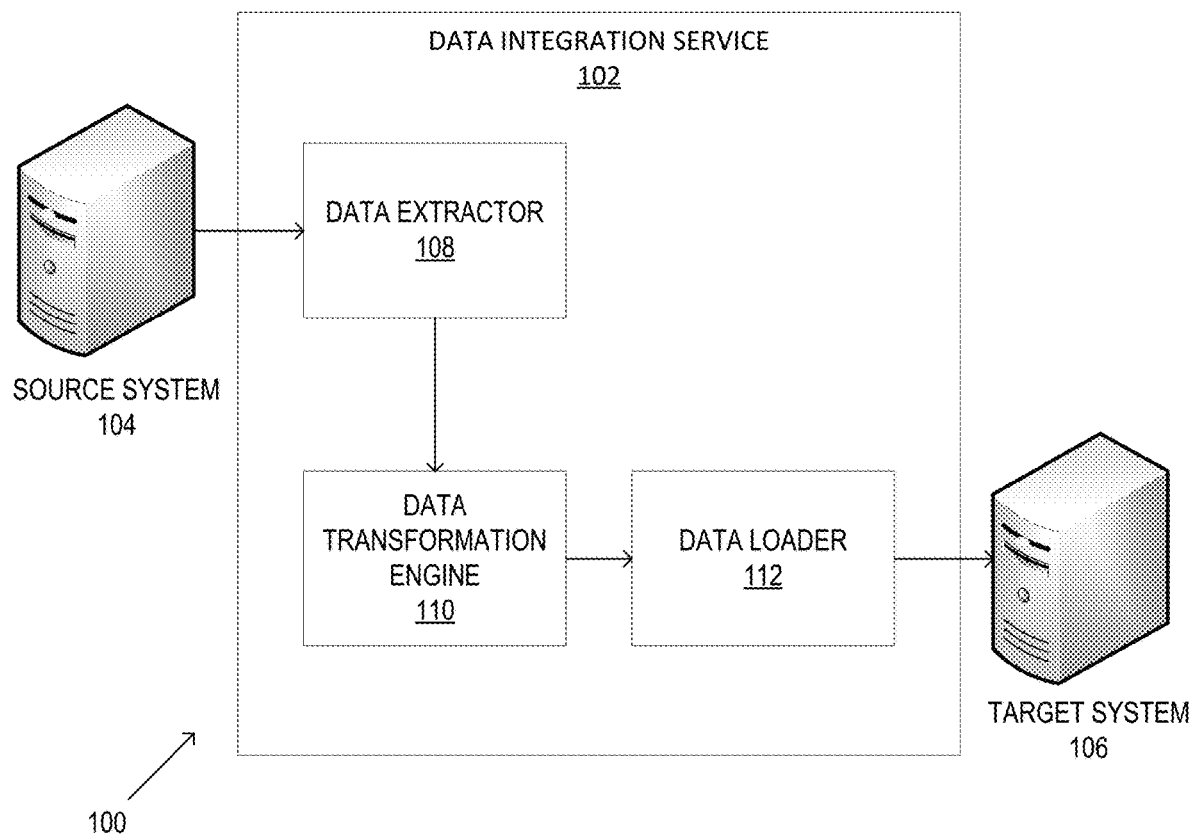
FIG. 1 is a block diagram illustrating an exemplary integration network environment, according to at least one embodiment.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

A cloud services provider (CSP) can integrate data between a source system and a target system by extracting data from a heterogeneous or homogenous source system, transforming the data into a proper format and structure for the target system, and loading the data into the target system. In general, the CSP can create a set of instructions that identify the source and target, define rules for transforming the data in the source system to be compatible with the target system, and create a mapping between the source system and the target system to define the data loading process. The CSP can then integrate the data from the source system based on the mapping.

In a conventional data integration service, data is statically mapped from the source system to the target system without regard to the values being loaded. For example, a table at the source system can include a ten-row column where all values in the column are associated with a client identifier (e.g., SourceClientId). In the conventional data integration service, all of the column's values can be mapped to a similar column (e.g., TargetClientId) in a table at the target system. This static approach can ignore the actual column values when generating the data integration mapping. For example, the actual column values can include names of individual clients (e.g., Client1, Client2, and Client3), which can be ignored by the conventional data integration service when generating a mapping from the source system to the target system. These values include valuable information that can be leveraged to integrate data more efficiently from the source system to the target system.

Embodiments described herein address the above-described issues via a data integration service that can select a destination in a target system based on a relationship between data values to be loaded from the source system (e.g., Client1, Client2, and Client3) and the destinations at the target system. The data integration service can match the data values from the source system with metadata from the target system that describes destinations at the target system. Using the example above, the herein described data integration service allows a user to identify data from a source system. The data integration service then compares the data values (e.g., Client1, Client2, and Client3) to metadata describing destinations at the target system. For example, the target system can include a bucket named Client1, a bucket named Client2, and a bucket named Client3. The data integration service can receive the metadata (i.e., bucket names) from the target system. The data integration service can match the data values (e.g., data values Client1, Client2, and Client3) from the source system to the metadata from the target system (e.g., bucket names Client1, Client2, and Client3). The data integration service can present the potential destinations to the user. Based on the user's selection, the data integration service can load the data associated with each client into their respective bucket. For example, the herein described data integration service can load all data associated with the value Client1 from the source system into the Client1 bucket at the target system. The herein data integration service can also load all values associated with Client2 and Client3 into their respective buckets at the target system. Once the data value is identified, a user can generate a mapping from the source system to the target system, where the identified data value itself is used as the metadata in the mapping to identify the destination. By focusing on the relationship between the data values and the destinations, the herein described data integration service loads data more intuitively than a conventional data integration service.

Referring to FIG. 1, a data integration environment 100 is shown according to an embodiment. The data integration environment 100 can execute a data integration service 102 to extract data from a source system 104, transform the data, and load the data into a target system 106. The source system 104 can include one or more interconnected computing devices. The one or more computing devices can be personal computing devices or networked computing devices that can implement one or more cloud computing applications or services. The computing devices included in the source system 104 can be in one or more data center environments (e.g., colocation centers).

The data integration service 102 can include a data extractor 108 for extracting data from the source system 104, a data transformer 110 for transforming the extracted data from the source system's format to a target system's format, and a data loader 112 for loading the transformed data into the target system 106. A user can provide the data integration service 102 with computer-readable instructions that identify the source system 104. The computer-readable instructions can further identify data stored in the source system 104 to be loaded into the target system 106. The data integration service 102 can, in turn, compare the data to be loaded and potential destinations (e.g., files, databases, buckets) at the target system 106. Based on the comparison, the data integration service 102 can recommend potential destinations at the target system 106 to load the data from the source system 104. The user can select one or more of the recommended destinations, and the data loader 112 can load the data into the target system 106. The target system 106 can include one or more interconnected computing devices. The one or more computing devices can be personal computing devices or networked computing devices that can implement one or more cloud computing applications or services. The target system can be included in a cloud computing environment managed by a CSP, or the target system 106 can be external to the cloud computing environment managed by the CSP.

Figure 2:
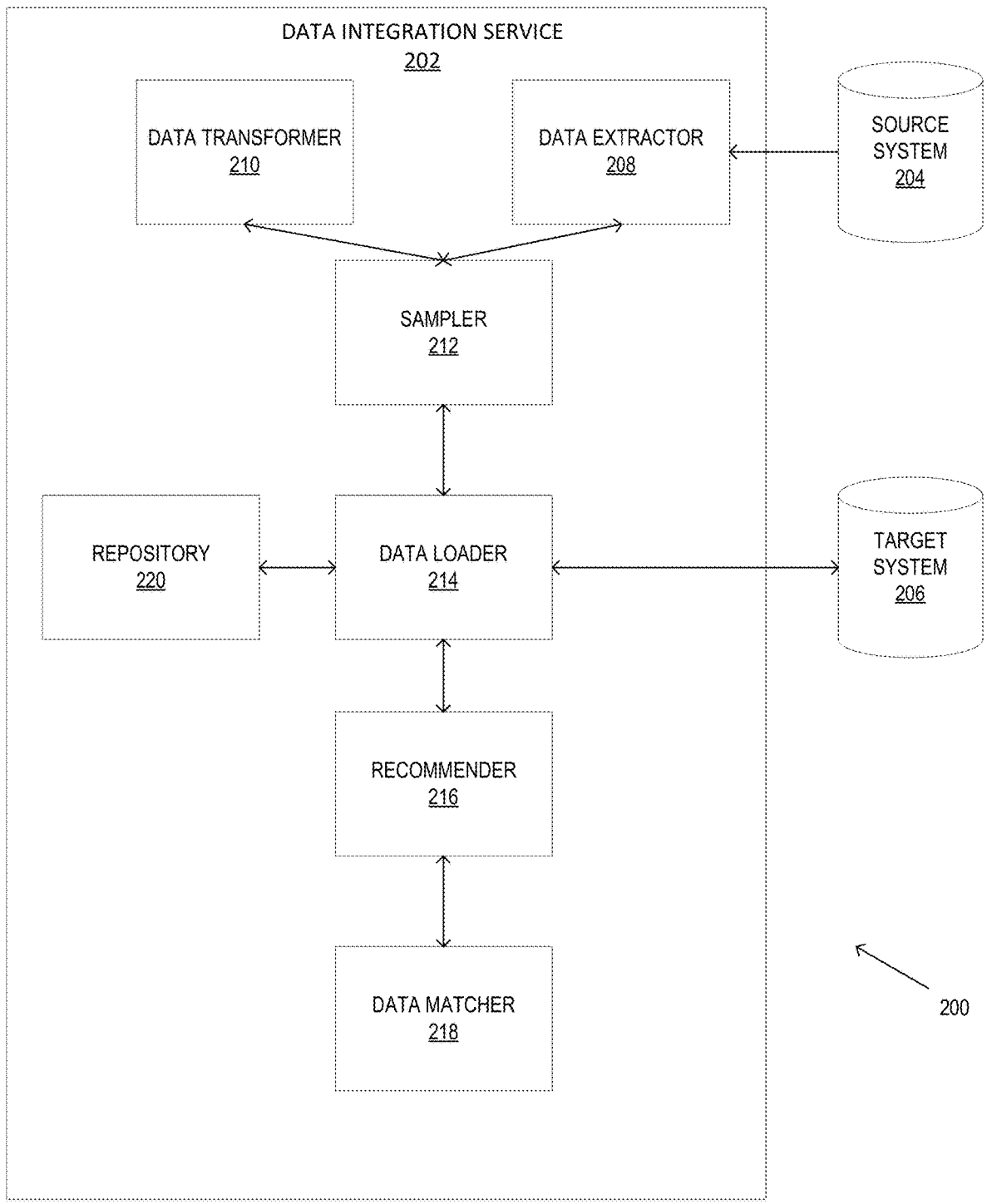
FIG. 2 is a block diagram illustrating an exemplary data integration service, according to at least one embodiment.

Referring to FIG. 2, an exemplary data integration environment 200 according to one or more embodiments is shown. As illustrated, a data integration service 202 can extract data from the source system 204 and load the data into a target system 206. The data integration service 202 can include a data extractor 208 for extracting data from the source system 204. The data integration service 202 can further include a data transformer 210 for transforming data from one format to another format. For example, the data transformer 210 can transform data received from the source system 204 in one format to another format appropriate for the target system 206. The data transformer 210 can receive data from the source system 204 and identify the format, for example, via a data profiling tool. During this process, the data types can be changed, null or duplicate data can be deleted, and the format can be transformed into a format appropriate for the target system 206.

The data integration service 202 can include a sampler 212 for receiving data from the data transformer 210, sampling the data, and providing the sampled data to a data loader 214. The sampler 212 can receive a request from the data loader 214 for sampled data. In response to receiving the request, the sampler 212 can request data from the data extractor 208. The sampler 212 can receive extracted data from the data extractor 208. The sampler 212 can also send a request to the data transformer 201 to transform the format of the extracted data. The sampler 212 can receive transformed data from the data transformer 210. The sampler 212 can sample the transformed data received from the data transformer 210. The sampler 212 can provide the sampled data to the data loader 214.

The data loader 214 can load (e.g., writing) data to the target system 206. The data loader 214 can combine rows of data from the source system 204 to create an in-memory batch. The data loader 214 can combine the rows based on a relationship of a row value and a destination at the target system 206. The data loader 214 can further load the batch into the target system 206. The data loader 214 can load multiple batches into the target system 206 in parallel. The number of batches that the data loader 214 can load in parallel can be based on the configuration of the target system 206.

The data integration service 202 can include a recommender 216 coupled to a data matcher 218. The recommender 216 and the data matcher 218 together can compare values in the sampled data with the metadata from the repository 220 and provide recommendations. The repository 220 can receive historical metadata describing destinations in the target system 206. The metadata can include names of files, names of buckets, and names of databases. The repository 220 can communicate with the target system 206 to update the metadata. The operations of the recommender 216 and the data matcher 218 are described with more particularity with reference to FIGS. 3 and 4.

Referring to FIG. 3, an exemplary data table 300 according to some embodiments is shown. The data table 300 can be sampled data transmitted from the data loader 214 to the recommender 216. The data table 300 can include metadata values, PersonID 302, PlanID 304, CoverageAmount 306, EnrollmentDate 308, and Department 310. The metadata describe the values for each column. For example, the values 23, 23, 45, 45, and 87 all correspond to the metadata value PlanID 304. As illustrated, each row's values can be associated. For example, in the first row, 1011, 23, 2000, Dec. 12, 2019, and DEPT-1 are associated together as belonging to a person with the identifier 1011.

The recommender 216 can transmit a request to the repository 220 for metadata used to describe destinations at the target system 206. Referring to FIG. 4, a metadata table 400 describing metadata describing destinations at the target system 206 is shown. The metadata table 400 includes metadata describing bucket names 402, files names 404 for a particular bucket, and usernames 406 for a particular tenancy. The descriptions in the right-hand column are provided for illustration purposes only. A bucket is a list of entries, where each entry is a key and a list of associated values. A key can be associated with the metadata, such as the bucket names 402, the file names 404 for a particular bucket, and the usernames 406 for a particular tenancy.

The recommender 216 can transmit a request to the data matcher 218 to determine a match between the sampled data (e.g., table 300) and the metadata (e.g., metadata table 400). In addition to the request, the recommender 216 can transmit the sampled data and the metadata. The data matcher 218 can compare the sampled data and the metadata to determine if there is a suitable destination for the data to be loaded. Referring to FIGS. 3 and 4, the data matcher 218 can compare the column values associated with each of the metadata values, PersonID 302, PlanID 304, CoverageAmount 306, EnrollmentDate 308, or Department 310 and the metadata values. For example, as illustrated by FIGS. 3 and 4, the values 1011, 1022, 1090, 3450, and 2300 associated with PersonID 302 are not used as metadata at the target system. However, the values DEPT-1, DEPT-1, DEPT-2, DEPT-1, and DEPT-2 associated with Department 310 correspond to some of the bucket names 402 (i.e., DEPT-1, DEPT-2, DEPT-3, DEPT-4, DEPT-5, DUMMY, DEPT-7, ALLBUCKET). Therefore, there is a match between the column values stored at the source system 204 and the metadata describing destinations at the target system 206.

The data matcher 218 can return the data match results to the recommender 216. The recommender can translate the results and return the recommendations to the data loader 214. The data loader 214 can present the recommendations to a user. The user can accept or reject the recommendations. Assuming the user accepts the recommendations, the user can generate a mapping between the source system 204 and the target system 206. The data loader 214 can receive the mapping and load the data from the source system 204 to the target system 206 pursuant to the mapping.

The data mapping can be a mapping from the values stored in the source system 204 to destinations in the target system 206. Referring to FIGS. 3 and 4 consider the values for the first row: 1011, 23, 2000, and Dec. 12, 2019, the values for the second row: 1022, 23, 8000, and Aug. 1, 2020, and the values for the fourth row: 3450, 45, 9000, and Sep. 9, 2018. As illustrated, each of these values is associated with DEPT-1. Also, consider the values in the third row: 1090, 45, 8900, and Mar. 7, 2016. Additionally, consider the values in the fifth row: 2300, 87, 1000, and Feb. 1, 2021. Each of these values is associated with DEPT-2. Furthermore, as illustrated, the target system 206 includes buckets associated with departments. Therefore, the values for the first row (1011, 23, 2000, and Dec. 12, 2019), the second row (1022, 23, 8000, and Aug. 1, 2020), and the fourth row (3450, 45, 9000, and Sep. 9, 2018) can be mapped to the data fields at the bucket associated with DEPT-1 at the target system 206. Furthermore, the values for the third row (1090, 45, 8900, and Mar. 7, 2016) and the fifth row (2300, 87, 1000, and Feb. 1, 2021) can be mapped to data fields at the bucket associated with DEPT-2 at the target system 206.

Figure 5:
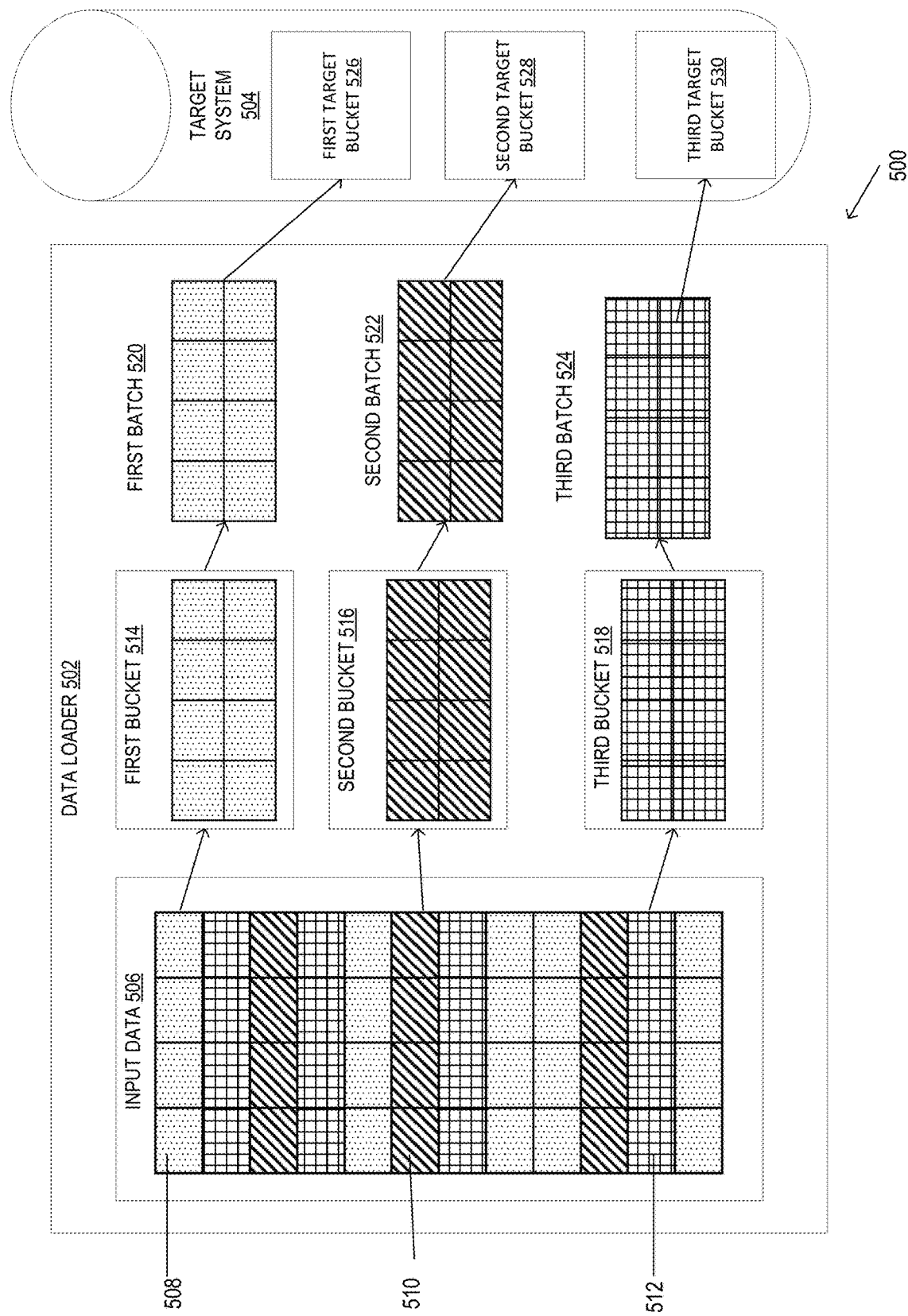
FIG. 5 is a block diagram illustrating an exemplary process for loading data into a target system, according to at least one embodiment.

Referring to FIG. 5, a block diagram illustrating a loading process 500 according to some embodiments is shown. As illustrated, the data loader 502 can load data into a target system 504. The data loader 502 can receive the input data 506, which is the data to be loaded from a source system to the target system 504. As illustrated, the input data 506 can include a combination of rows of data associated with three different destinations. For example, the input data 506 can include rows 508 of values associated with DEPT-1 (dotted rows), rows 510 associated with DEPT-2 (forward slash rows), and rows 512 of values associated with DEPT-3 (grid rows).

The data loader 502 can create in-memory buckets such as the first bucket 514, the second bucket 516, and the third bucket 518. In some instances, an in-memory bucket exists, and the data loader 502 can use the pre-existing bucket. The data loader 502 can further associate each bucket key with a unique value describing a destination at the target system 504. The data loader 502 can load rows of values from the input data 506 into each appropriate bucket. For example, the data loader 502 can load all rows 508 with values associated with DEPT-1 into the first bucket 514. The data loader 502 can load all rows 510 with values associated with DEPT-2 into the second bucket 516. The data loader 502 can load all rows 512 with values associated with DEPT-3 into the third bucket 518.

The data loader 502 can be configured to respectively load a set number of values into the first bucket 514, the second bucket 516, and the third bucket 518. The set number of values can be considered a batch. In the instance that the data loader 502 loads the set number of values into a bucket, the data loader 502 can remove the batch from the bucket. As illustrated, a first batch 520, a second batch 522, and a third batch 524 have been removed from their respective bucket and are set to be loaded into the target system 504. The data loader 502 can load the first batch 520 into the first target bucket 526, the second batch 522 into the second target bucket 528, and the third batch 524 into the third target bucket 530. The first target bucket 526 can be associated with DEPT-1, the second target bucket 528 can be associated with DEPT-2, and the third target bucket 530 can be associated with DEPT-3.

Figure 6:
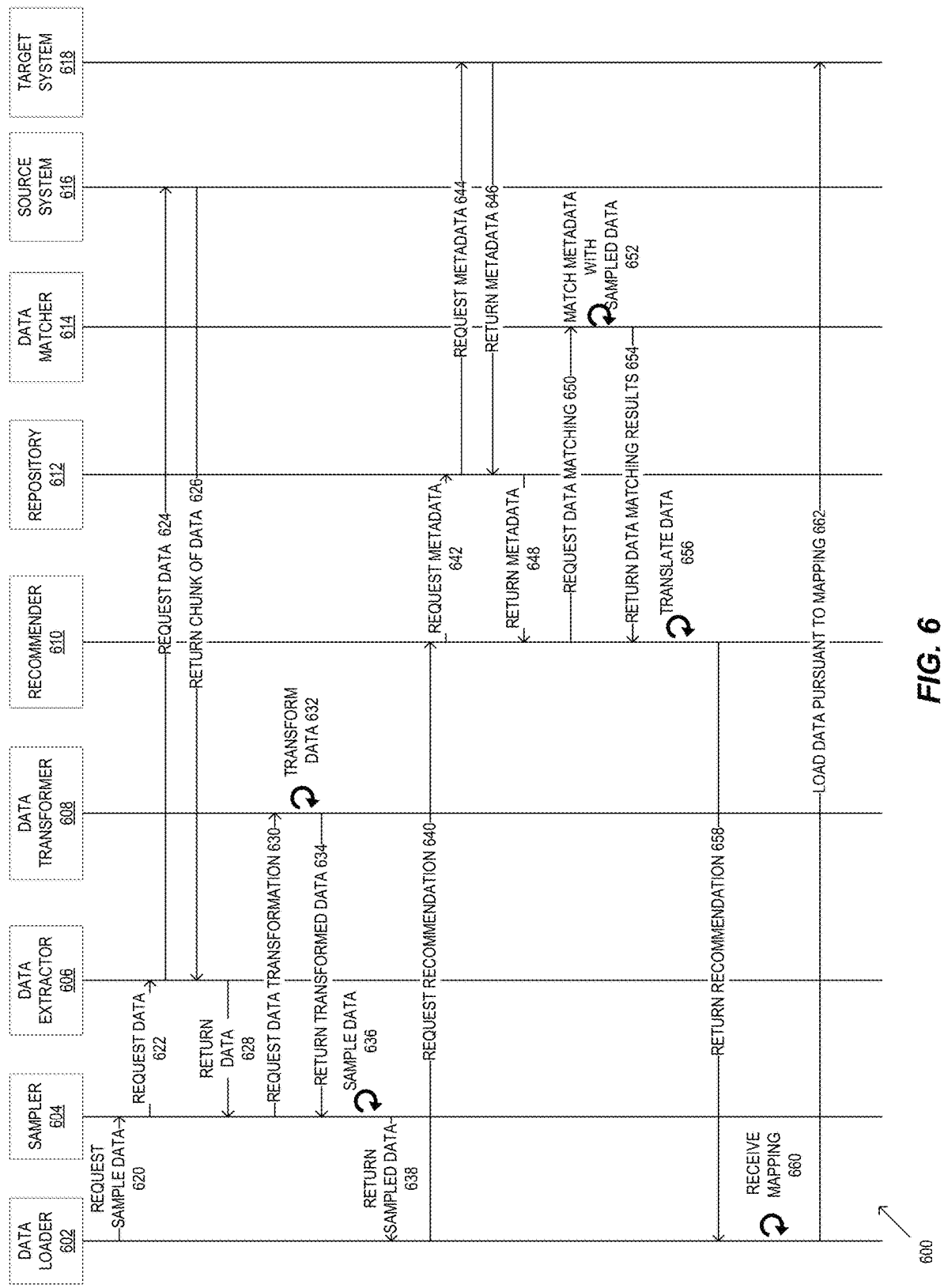
FIG. 6 is an exemplary signaling process diagram for metadata value-based data integration, according to at least one embodiment.

Referring to FIG. 6, a signaling process 600 illustrating an exemplary secure boot partition process according to one or more embodiments is shown. As shown in FIG. 6, a data loader 602, a sampler 604, a data extractor 606, a data transformer 608, a recommender 610, a repository 612, a data matcher 614, a source system 616, and a target system 618 can interact with each other. The operations of processes 600 and 700 may be performed by any suitable computing device and may be used to perform one or more operations of these processes. Processes 600 and 700 (described below) are illustrated as logical flow diagrams, each operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

At 620, the data loader 602 can request sample data from the sampler 604 in relation to a data integration job. The data loader 602 can be software configured to integrate data to the target system 618. The data loader 6-2 can include intermediary software such as an application programming interface (API) for communicating with the target system 618. The sampler 604 can be software that can sample data stored in the source system 616. The source system 616 can be a computing system that stores data to be integrated into the target system 618. The target system 618 can by a computing system selected to receive integrated data. The data integration job can be, for example, a set of computer-readable instructions to integrate data stored in the source system 616 to the target system 618. For example, the source system 616 can be a legacy computing system, and the target system 618 can be a newer version of the computing system. The data integration job can be a set of computer-readable instructions to integrate data from the legacy computing system to the newer version of the computing system.

At 622, the sampler 604 can send a request to the data extractor 606 for a chunk of data from the source system 616. The data extractor 606 can be software configured to retrieve data from the source system 616. The data extractor 606 can include intermediary software such as an application programming interface (API) for communicating with the source system 616. A data chunk can be a unit of data retrieved from the source system 616 for processing.

At 624, the data extractor 606 can transmit a request to the source system 616 for a chunk of data. In response to receiving the request, the source system 616 can apply a chunking algorithm to divide the stored data into units of data. At 626, the source system 616 can return a chunk of data to the data extractor 606. At 628, the data extractor 606 can return the chunk of data to the sampler 604.

At 630, the sampler 604 can send the chunk of data to the data transformer 608. In addition to the chunk of data, the sampler 604 can transmit instructions to transform the chunk of data into a format and structure appropriate for the target system 618. The data transformer 608 can be software configured to transform data from one format to another format. For example, the data transformer 608 can transform the chunk of data from the format of the source system 616 to the format of the target system 618. At 632, the data transformer 608 can transform the format of the chunk of data into a format suitable for the target system 618. Data transformation can be the transformation of data from one format into another format. In some instances, the data stored in the source system 616 can be in a raw and unusable format. The chunk of data from the source system 616 can be cleansed to remove redundant values and fill in missing values. Data transformation can further include standardizing the chunk of data to make it more readable. At 634, the data transformer 608 can return the transformed chunk of data to the sampler 604.

At 636, the sampler 604 can sample the transformed chunk of data. At 638, the sampler 604 can return the sampled data to the data loader 602. In response to receiving the sampled data, the data loader 602 can request a recommendation from the recommender 610 at 640. The recommendation can be one or more destinations in the target system 618. In addition to the request, the data loader 602 can transmit the identity of the target system 618 and the sampled data to the recommender 610. In response to receiving the request and the sampled data from the data loader 602, the recommender 610 can request metadata from the repository 612 at 642. The metadata can be descriptions of destinations in the target system 618. In addition to searching its own database, the repository 612 can transmit a request to the target system 618 for metadata describing destinations in the target system 618 at 644. In this sense, the repository 612 has an up-to-date set of metadata. The metadata can be retrieved by the target system 618 from various sources such as previous computer-readable instructions for integrating data, a file system at the target system 618, and object storage at the target system 618. At 646, the target system 618 can return the requested metadata to the repository 612. At 648, the repository 612 can return the metadata stored in its own database, and the metadata returned from the target system 618 to the recommender 610. It should be appreciated that the recommender 610 can be configured differently than a conventional recommender. A conventional recommender can be configured to determine relationships between values of different columns. The herein described recommender 610 recommends destinations at the target system 618.

At 650, the recommender 610 can transmit a request to the data matcher 614 to match the metadata from the repository 612 with the sampled data from the data loader 602. At 652, the data matcher 614 can match the metadata from the repository 612 with the sampled data from the data loader 602. At 654, the data matcher 614 can return the matching results to the recommender 610.

At 656, the recommender 610 can translate the matching results to generate recommendations. At 658, the recommender 610, can return the recommendation(s) to the data loader 602. The data loader 602 can present the recommendations to a user. The user can accept or reject the recommendations. Based on accepting the recommendations, the user can input a mapping into the data loader 602. At 660, the data loader can receive the mapping between the location of the data in the source system 616 and a destination in the target system 618. At 662, the data loader 602 can load the data pursuant to the mapping.

Figure 7:
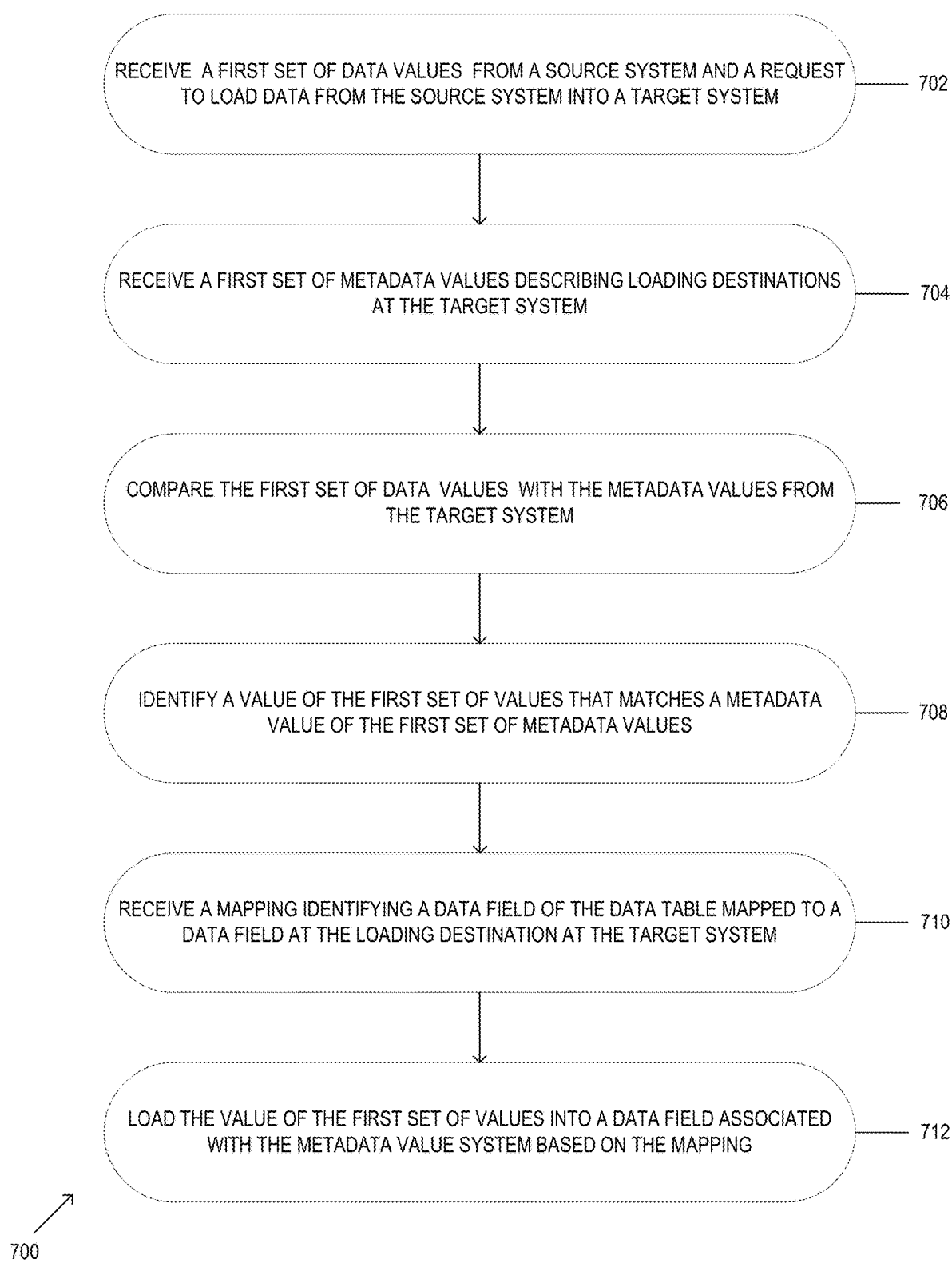
FIG. 7 is a block diagram illustrating an exemplary process for metadata value-based data integration, according to at least one embodiment.

Referring to FIG. 7, a block diagram illustrating an example method 700 for determining a destination at a target system according to some embodiments is shown. At 702, a computing device can receive a first data set from a source system and a request to load data from the source system to a target system. The first data set can be in the form of a data table that includes data values and metadata values that describe the data values. The first data set can further be data sampled from the source system. The instructions can further include an identity of the target system and the data format of the target system.

At 704, the computing device can receive a first metadata set from the target system. In some embodiments, the computing device can transmit a request to a repository for the first metadata set. The request can include an identity of the target system. The repository can retrieve metadata values used by the target system to store data. The metadata can be the form of identities of various storage locations such as file names, bucket names, and database names of the target system.

At 706, the computing device can compare the first data set from the source system with the metadata values from the target system. For example, the first data set can be in the form of a data table. One column of the data table can include a column of values for clients (e.g., Client_1, Client_2, Client_3), a column of values for contact names for the clients (e.g., First_Name, Second_Name Third_Name), and a column of values for a client type of the clients (e.g., individual, corporation, partnership). The values can be associated with each other. For example, First_Name can be the name of the contact person for Client_1, and Client 1 can be an individual. The target system can include files for different clients. For example, the target system has a first file for Client1, a second file for Client2, and a third file for Client3. Each file can include metadata in the form of a file name describing the associated client.

At 708, the computing device can identify a value of the first data set that matches a metadata value of the first metadata set. For example, the target system may not store data based on the contact name and the client type. However, the target system may store data in files based on the client name. Therefore, the computing system can match the client names from the first data set with the file names in the target system.

At 710, the computing device can receive a data integration mapping. The data integration mapping is mapping for integrating data from the source system to the target system. The data integration mapping can be generated based on identifying the value of the first data set from the source system and the matching metadata value of the first metadata set from the target system.

At 712, the computing device can load values associated with the value of the first data set from the source system into the data field associated with the metadata value of the first metadata set from the target system into the target system pursuant to the mapping and the computer-readable instructions. Continuing with the example from above, the computing device can load "Client_1" and "individual" into data fields associated with the file Client1 at the target system.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing, and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may first need to be set up. In some instances, the provisioning can be done manually, a provisioning tool may be utilized to provision the resources, and/or deployment tools may be utilized to deploy the code once the infrastructure is provisioned.

Figure 8:
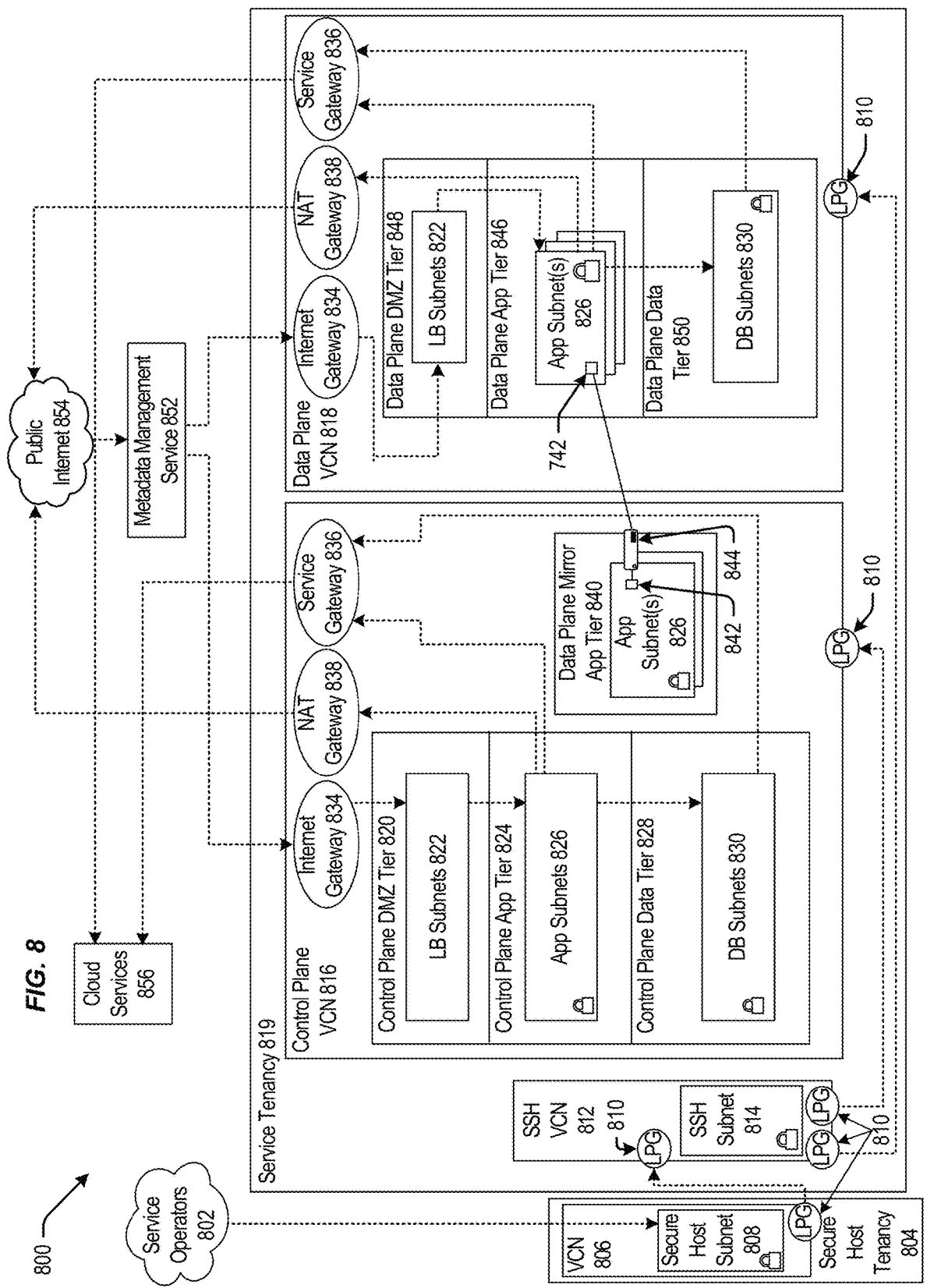
FIG. 8 is a block diagram illustrating a pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 14, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
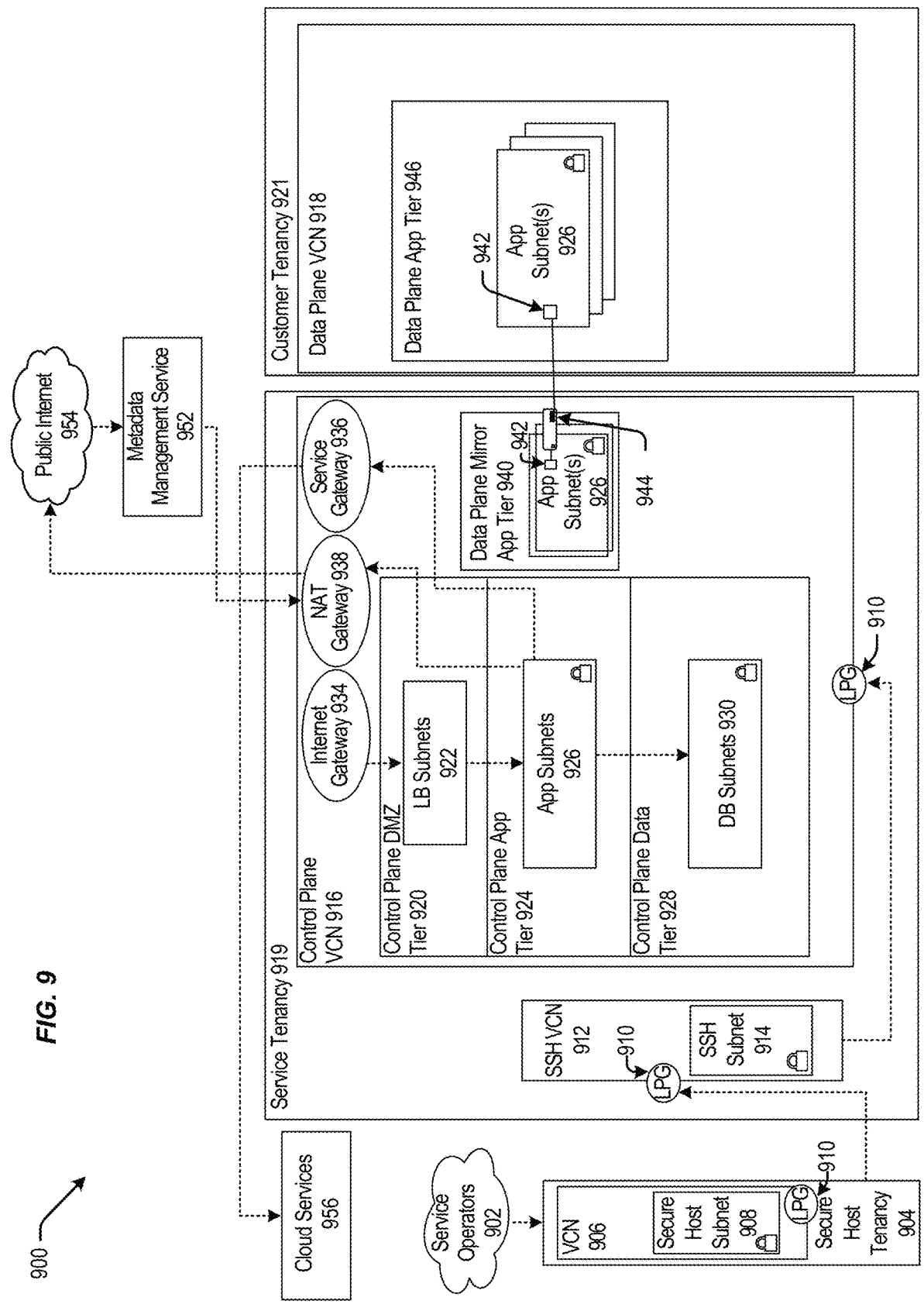
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 976 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 910 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842 of FIG. 8) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 946 of FIG. 9) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 802 of FIG. 8) that can be communicatively coupled to public Internet 954 (e.g., public Internet 804 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 1," may be located in Region 1 and in "Region 2." If a call to Deployment 1 is made by the service gateway 936 contained in the control plane VCN 916 located in Region 1, the call may be transmitted to Deployment 1 in Region 1. In this example, the control plane VCN 916, or Deployment 1 in Region 1, may not be communicatively coupled to, or otherwise in communication with, Deployment 2 in Region 2.

Figure 10:
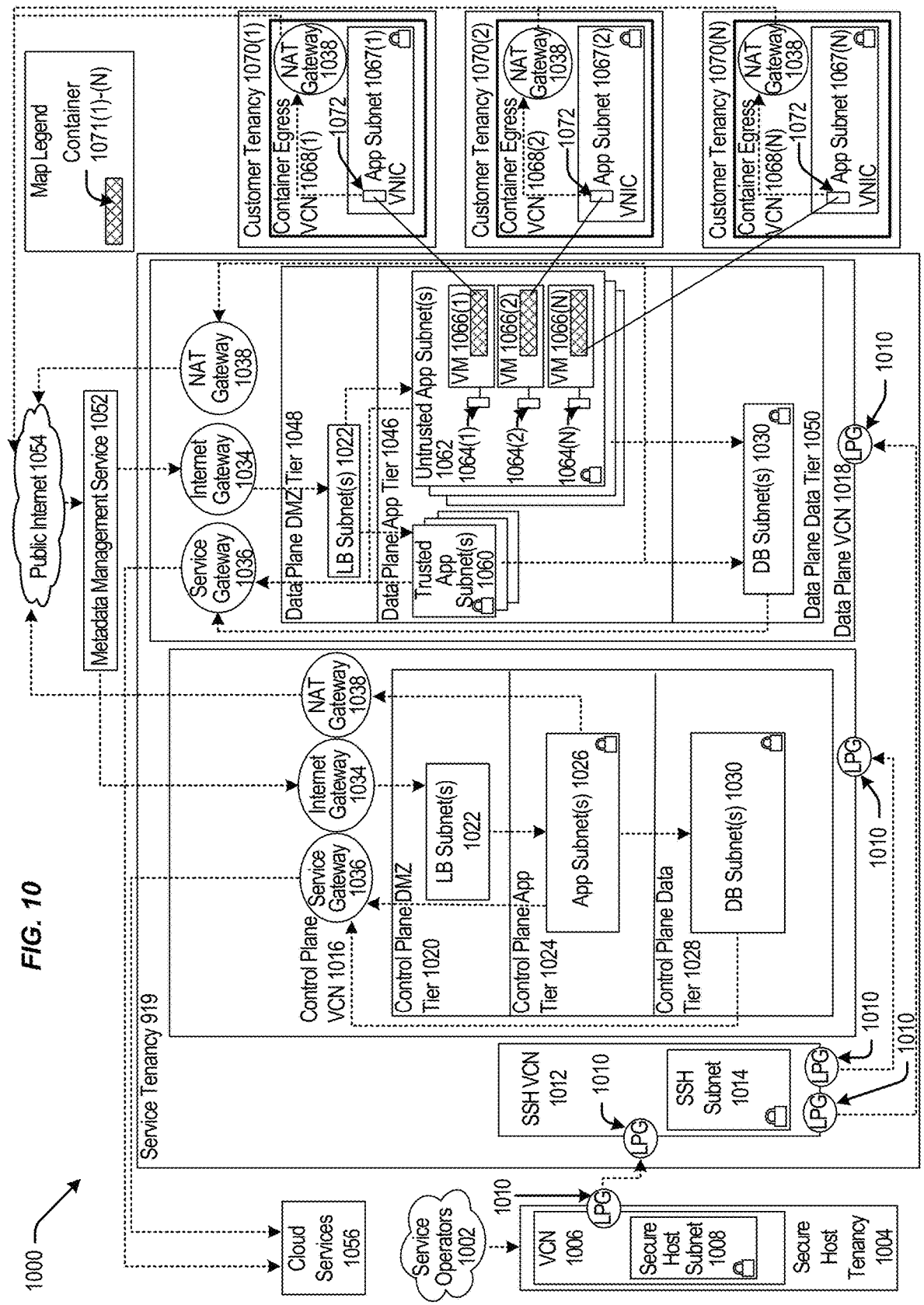
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 1006 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway 836 of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8). The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
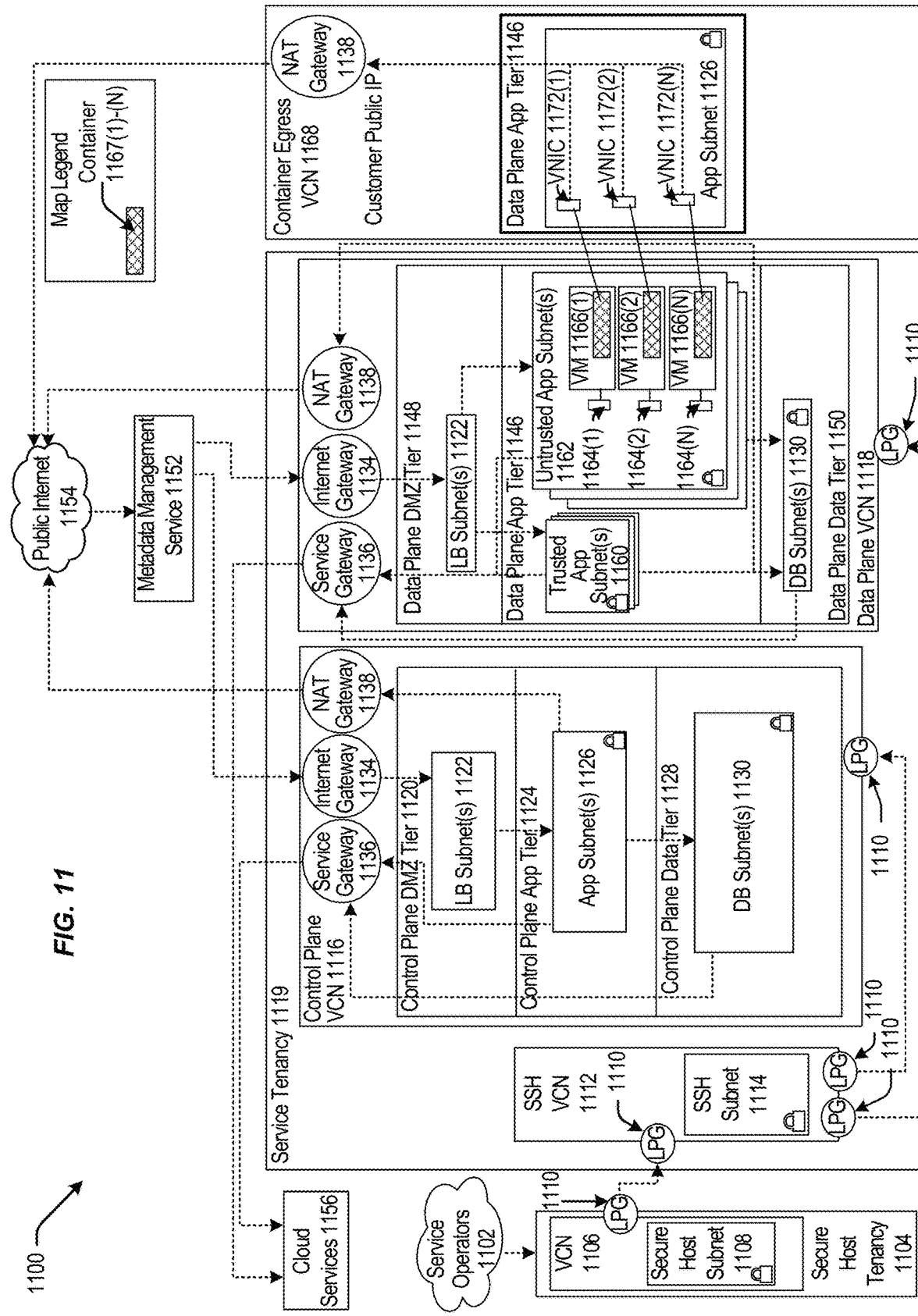
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 830 of FIG. 8). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway 836 of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
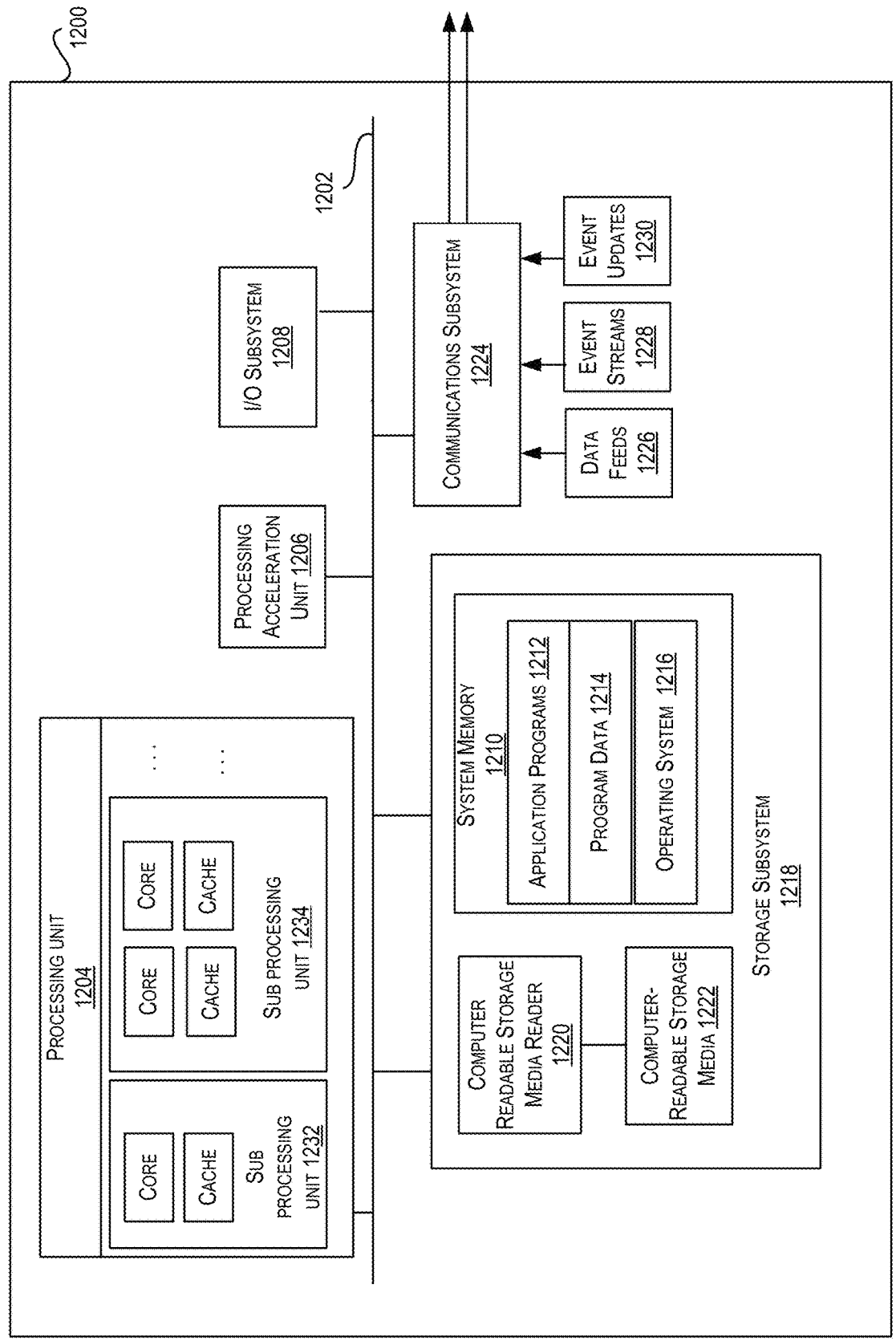
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer-readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem % 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 302.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
  receiving, by a computing device, a first data set from a source system and computer-readable instructions to load data from the source system into a target system;
  receiving, by the computing device, a first metadata set from the target system, the first metadata set associated with a second data set stored at the target system, and the first metadata set describing destinations at the target system;
  comparing, by the computing device, data values in the first data set with metadata values in the first metadata set;
  identifying, by the computing device, a first data value of the data values that matches a metadata value of the metadata values based at least in part on the comparison, the first data value having a same value as the metadata value and being associated with a second data value of the first data set;
  receiving, by the computing device, a data integration mapping comprising a mapping of the second data value to a data field associated with the metadata value, the data integration mapping being generated based at least in part on identifying the first data value and the metadata value; and
  loading, by the computing device, the second data value into the data field pursuant to the mapping and the computer-readable instructions.

2. The method of claim 1, wherein the first data set comprises sampled data from the data.

3. The method of claim 1, wherein receiving the first metadata set comprises requesting the first metadata set from a repository, and wherein the repository stores metadata describing destinations at the target system.

4. The method of claim 1, wherein the first data set is included in a data table stored at the source system.

5. The method of claim 4, wherein the data table comprises the first data set and a second metadata set describing the first data set.

6. The method of claim 1, further comprising transforming a first format of the first data set into a second format of the target system.

7. The method of claim 1, wherein a destination of the destinations comprises a bucket at the target system.

8. The method of claim 1, further comprising determining that one or more additional data items at the source system are associated with the first data value.

9. The method of claim 8, further comprising, based on the determination, loading the one or more additional data items from the source system into the target system.

10. The method of claim 9, wherein the target system includes the data field, and wherein the one or more additional data items are loaded into the data field at the target system.

11. The method of claim 1, further comprising determining that one or more additional data items in the first data set are associated with the first data value.

12. The method of claim 11, further comprising loading the one or more additional data items from the source system into the data field, at the target system, in response to identifying an association between the one or more additional data items and the first data value.

13. The method of claim 11, further comprising loading data items from the source system into the target system based on the one or more additional data items being associated with the first data value.

14. The method of claim 1, further comprising performing one determination that one or more additional data items in the first data set are associated with the first data value and loading another data item from the source system into the data field based on the one determination.

15. The method of claim 1, wherein the target system includes the data field, and further comprising loading all data items at the source system that are associated with the first data value into the data field at the target system.

16. The method of claim 15, wherein the data items are each loaded into the data field at the target system.

17. The method of claim 1, further comprising loading, by the computing device, all data items in the first data set that are associated with the first data value from the source system into the data field.

18. The method of claim 1, wherein a destination of the destinations comprises a file at the target system or a database at the target system.

19. The method of claim 1, further comprising, after identifying the first data value, generating a mapping from the source system to the target system using the identified first data value.

20. The method of claim 19, wherein the identified first data value itself is used as metadata in the mapping to identify a destination at the target system.

21. The method of claim 20, wherein the destination is the data field at the target system.

22. A system comprising: one or more processors; and one or more computer-readable media including instructions that, when executed by the one or more processors, cause the one or more processors to initiate operations comprising:
receiving each of a first data set from a source system and computer-readable instructions to load the first data set into a target system;
receiving a first metadata set from the target system, the first metadata set associated with a second data set stored at the target system, and the first metadata set describing destinations at the target system;
comparing data values in the first data set with metadata values in the first metadata set;
identifying a first data value of the data values that matches a metadata value of the metadata values based at least in part on the comparison, the first data value having a same value as the metadata value and being associated with a second data value of the first data set;
storing a data integration mapping comprising a mapping of the second data value to a data field associated with the metadata value, the data integration mapping being generated based at least in part on identifying the first data value and the metadata value; and
loading the second data value into the data field pursuant to the mapping and the computer-readable instructions.

23. The system of claim 22, wherein the first data set comprises sampled data from the first data set.

24. The system of claim 22, wherein receiving the first metadata set comprises requesting the first metadata set from a repository, wherein the repository stores metadata describing destinations at the target system.

25. The system of claim 22, wherein the first data set is included in a data table stored at the source system.

26. The system of claim 25, wherein the data table comprises the first data set and a second metadata set describing the first data set.

27. The system of claim 22, the instructions further causing the one or more processors to transform a first format of the first data set into a second format of the target system.

28. The system of claim 22, wherein a destination of the destinations comprises a file, a bucket, or a database at the target system.

29. One or more non-transitory media having instructions which, when executed by a processor, causes the processor to initiate operations comprising:
receiving a first data set from a source system and computer-readable instructions to load the first data set into a target system;
receiving a first metadata set from the target system, the first metadata set associated with a second data set stored at the target system, and the first metadata set describing destinations at the target system;
comparing data values in the first data set with metadata values in the first metadata set;
identifying a first data value of the data values that matches a metadata value of the metadata values based at least in part on the comparison, the first data value having a same value as the metadata value and being associated with a second data value of the first data set;
receiving a data integration mapping comprising a mapping of the second data value to a data field associated with the metadata, the data integration mapping being generated based at least in part on identifying the first data value and the metadata value; and
loading the second data value into the data field pursuant to the mapping and the computer-readable instructions.

30. The one or more non-transitory media of claim 29, wherein the first data set comprises sampled data from the first data set.

31. The one or more non-transitory media of claim 29, wherein receiving the first metadata set comprises requesting the first metadata set from a repository, wherein the repository stores metadata describing destinations at the target system.

32. The one or more non-transitory media of claim 29, wherein the first data set is included in a data table stored at the source system.

33. The one or more non-transitory media of claim 32, wherein the data table comprises the first data set and a second metadata set describing the first data set.

34. The one or more non-transitory media of claim 29, the operations further comprising transforming a first format of the first data set into a second format of the target system.

* * * * *

UNITED STATES PATENT AND TRADEMARK OFFICE
CERTIFICATE OF CORRECTION

| | |
|---|---|
| PATENT NO. | : 11,899,680 B2 |
| APPLICATION NO. | : 17/690495 |
| DATED | : February 13, 2024 |
| INVENTOR(S) | : Gattani et al. |

It is certified that error appears in the above-identified patent and that said Letters Patent is hereby corrected as shown below:

In the Claims

In Column 28, Line 44, in Claim 29, delete "metadata," and insert -- metadata value, --, therefor.

Signed and Sealed this
Fourteenth Day of May, 2024

Katherine Kelly Vidal
*Director of the United States Patent and Trademark Office*